United States Patent
Ohk

(10) Patent No.: US 8,290,293 B2
(45) Date of Patent: Oct. 16, 2012

(54) IMAGE COMPENSATION IN REGIONS OF LOW IMAGE CONTRAST

(75) Inventor: Hyung-soo Ohk, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1153 days.

(21) Appl. No.: 11/761,467

(22) Filed: Jun. 12, 2007

(65) Prior Publication Data

US 2008/0089582 A1    Apr. 17, 2008

(30) Foreign Application Priority Data

Oct. 17, 2006    (KR) .......................... 10-2006-100738

(51) Int. Cl.
*G06K 9/40* (2006.01)
*H04N 9/64* (2006.01)
*H04N 5/202* (2006.01)
*H04N 1/40* (2006.01)

(52) U.S. Cl. ......... 382/274; 348/251; 348/254; 358/461

(58) Field of Classification Search .................. None
See application file for complete search history.

(56) References Cited

U.S. PATENT DOCUMENTS

| | | | |
|---|---|---|---|
| 6,175,660 B1 * | 1/2001 | Nabeshima et al. | 382/274 |
| 6,806,980 B2 | 10/2004 | Xu et al. | |
| 7,016,081 B2 * | 3/2006 | Araki et al. | 358/3.26 |
| 7,417,765 B2 * | 8/2008 | Araki | 358/1.9 |
| 7,430,065 B2 * | 9/2008 | Arakai et al. | 358/3.26 |
| 7,477,426 B2 * | 1/2009 | Guan et al. | 358/474 |
| 7,483,564 B2 * | 1/2009 | Jia | 382/154 |
| 2002/0085248 A1 * | 7/2002 | Xu et al. | 358/509 |
| 2004/0125411 A1 * | 7/2004 | Tonami et al. | 358/2.1 |
| 2005/0175239 A1 * | 8/2005 | Araki et al. | 382/177 |
| 2005/0280849 A1 | 12/2005 | Kojima et al. | |
| 2006/0023942 A1 | 2/2006 | Guleryuz | |
| 2006/0193533 A1 * | 8/2006 | Araki et al. | 382/275 |

FOREIGN PATENT DOCUMENTS

| | | |
|---|---|---|
| EP | 1221810 | 7/2002 |
| JP | 2006-148259 | 6/2006 |
| KR | 1998-63589 | 10/1998 |
| KR | 2006-42652 | 5/2006 |

OTHER PUBLICATIONS

European Search Report issued May 19, 2010 in EP Application No. 07113707.9.
Chinese Office Action issued Sep. 29, 2011 in CN Application No. 200710141864.5.
Chinese Office Action issued Aug. 11, 2010 in CN Application No. 200710141864.5.

* cited by examiner

*Primary Examiner* — Randolph I Chu
(74) *Attorney, Agent, or Firm* — Stanzione & Kim, LLP

(57) ABSTRACT

To compensate an image, a profile thereof is obtained from pixel values in a marginal area of the image. A background value of the image determined from the profile and correction to the image is performed in accordance with the background value and the profile.

16 Claims, 8 Drawing Sheets

IMAGE COMPENSATION IN REGIONS OF LOW IMAGE CONTRAST

CROSS-REFERENCE TO RELATED APPLICATIONS

This application claims priority under 35 U.S.C. §119(a) from Korean Patent Application No. 2006-0100738, filed on Oct. 17, 2006 in the Korean Intellectual Property Office, the disclosure of which is incorporated herein by reference in its entirety.

BACKGROUND OF THE INVENTION

1. Field of the Invention

The general inventive concept described herein is directed to image compensation and, particularly, image forming with compensation of a distorted image.

2. Description of the Related Art

Generally, an image forming apparatus, such as a multi function apparatus, a duplicator, a scanner, etc., includes a scanning part to scan an object to be copied and to generate image data of the scanned object. If the object to be copied is a book, opposite pages are opened and placed face-down on a scan plane to be copied. Since a central part of the book between the opposing pages is removed from the scan plane by a height determined by the binding area of the book, the amount of light reaching the central part is smaller than the amount of light reaching the part of the pages in contact with the scan plane. Consequently, in a scanned image, the central part of the opposing pages, in an area which will be referred to herein as a "folding area," becomes darker than comparably formatted other parts in the image. FIG. 1 illustrates an example of the folding area 110.

The folding area 110 is a substantial distortion in the resulting image and it is therefore desirable to remove the folding area 110. Typically, to remove the folding area 110, a parameter is extracted by a histogram analysis of the input image data, and compensation of the distorted image data is performed based on the extracted parameter.

In conventional compensation, the histogram of the image data is analyzed to obtain the locations of sections where the pixel value of a foreground part and a pixel value of a background part are of a predetermined brightness, and then compensation is performed section-by-section in accordance with the brightness of the section being compensated. Since this compensation requires that the foreground part and the background part of the input image are consistently presented in the same colors, respectively, that is, the foreground part is always in one color and the background part is always in another color, such as when the input image is composed of dark characters on a light background, application of this compensation technique is limited. Also, if a book contains a picture, it is impossible by the traditional methods to distinguish a background value from a foreground value by the histogram analysis. Consequently, it is difficult to remove the folding area 110 through traditional distortion compensation of an image.

SUMMARY OF THE INVENTION

Accordingly, the present general inventive concept provides an image forming apparatus and an image forming method to compensate an image for distortion generated through varying distances between a scan plane of an image forming apparatus and an object to be copied.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing an image forming method, comprising: generating a profile from pixel values of a marginal area of an image, determining a background value of the image data by analyzing the profile, and performing a correction on pixels of the image.

The present general inventive concept may be embodied where the profile generating includes obtaining an upper profile in an upper marginal area and a lower profile in a lower marginal area.

The present general inventive concept may also be embodied where each profile is obtained from an image row having a maximum pixel value in each marginal area.

The present general inventive concept may also be embodied where the correction performing corrects a brightness value of the image pixel.

The present general inventive concept may also be embodied where the correction performing further includes converting a red pixel value, a green pixel value and a blue pixel value of the image into the brightness value and a chrominance value.

The foregoing and/or other aspects and utilities of the present general inventive concept may also be achieved by providing an image forming apparatus, comprising: a profile generating part which uses a pixel value of a marginal area of an image to generate a profile, a profile analyzing part which analyzes the profile to determine a background value of the image, and an image correcting part which corrects a brightness value of the image in accordance with the profile and the background value.

The foregoing and/or other aspects and utilities of the present general inventive concept may also be achieved by providing an image compensating apparatus, comprising a memory part to store a copy of an image as a plurality of image pixels including background image pixels having a background value corresponding to a background characteristic of the image, and an image processing part to determine to background value from at least one area of the image pixels and to compensate the image pixels in a region of any copy of the image in which the background image pixels have a value of the background characteristic other than the background value.

The foregoing and/or other aspects and utilities of the present general inventive concept may also be achieved by providing a method of compensating images, comprising storing a copy of an image as a plurality of image pixels including background image pixels having a first background value corresponding to a background characteristic of the image, determining the first background value from at least one area of the image pixels, and compensating the image pixels in a region of any copy of the image in which the background image pixels have a value of the background characteristic other than the first background value.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
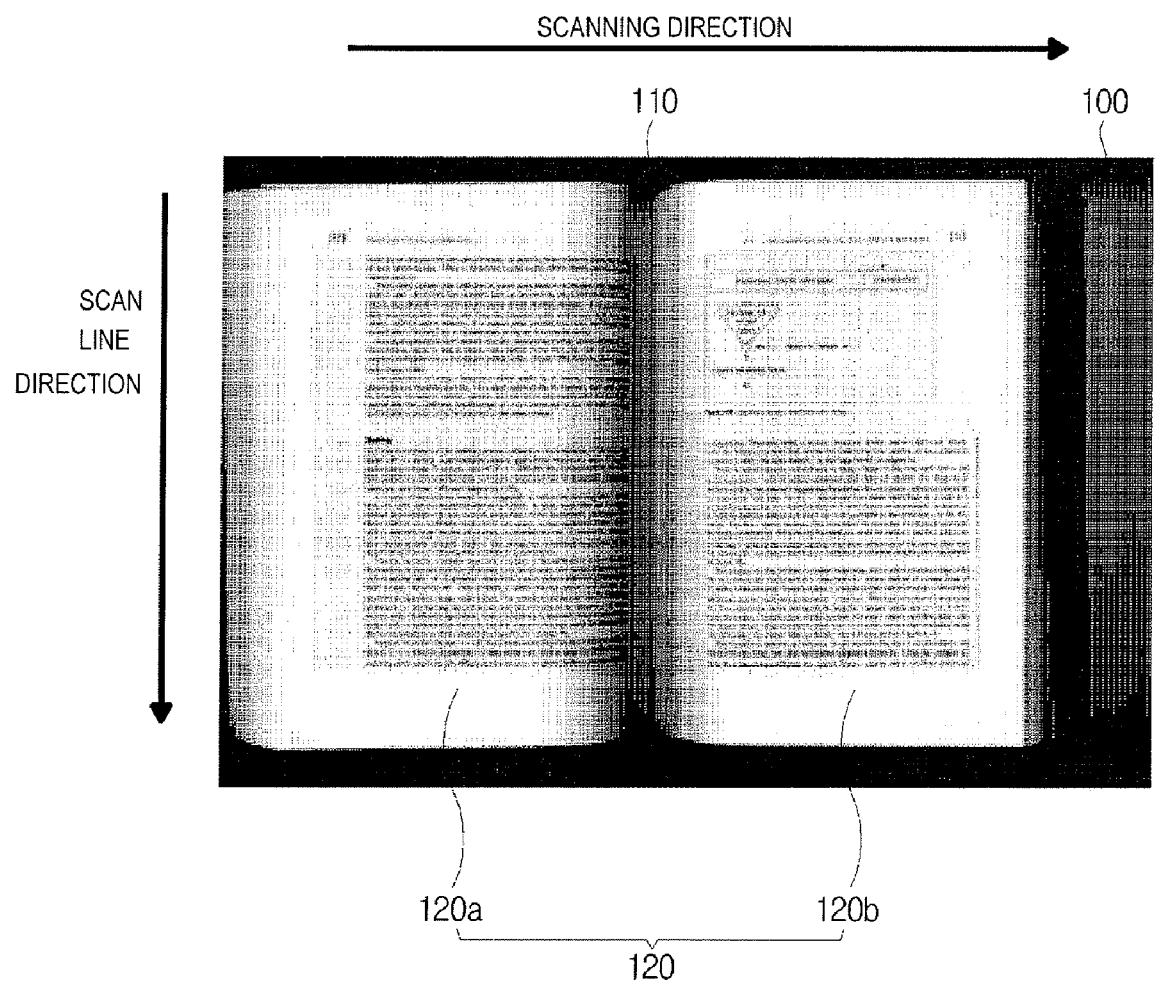
FIG. 1 illustrates an example of a folding area by a copy of a book-bound document.

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

Figure 2:
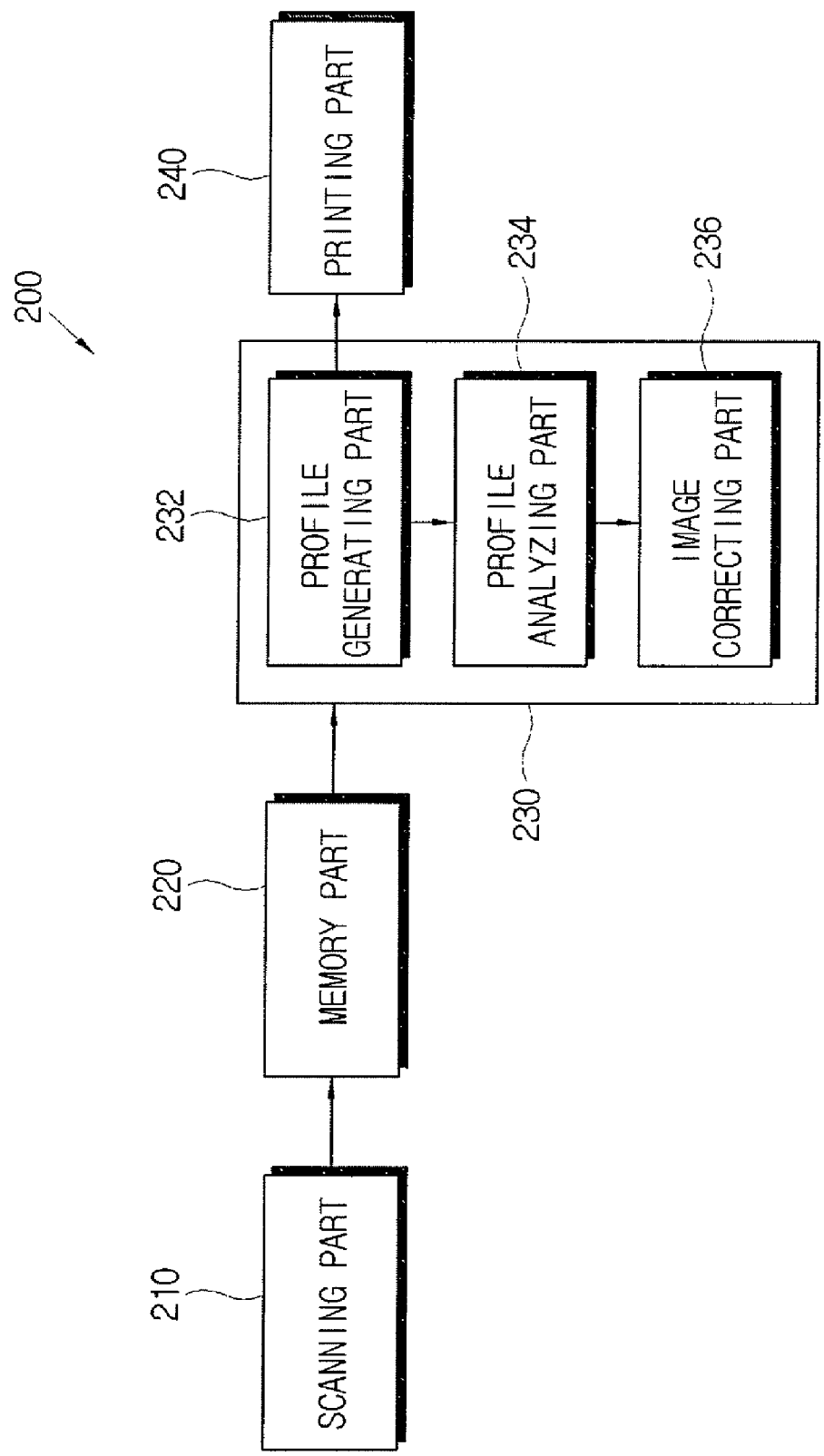
FIG. 2 is a block diagram illustrating a configuration of an image forming apparatus according to an exemplary embodiment of the present general inventive concept.

An image forming apparatus 200 according to an exemplary embodiment of the present general inventive concept may be embodied as a scanner, a duplicator, a multi function apparatus, etc. As illustrated in FIG. 2, the image forming apparatus 200 comprises a scanning part 210, a memory part 220, an image processing part 230 and a printing part 240. It is to be understood that the functional components illustrated in FIG. 2 are in an exemplary configuration that facilitates description of various functional features of the present general inventive concept. Other configurations that combine the functions to be described into certain components or that distribute the functions to be described among several other components are possible without deviating from the intended spirit and scope of the present general inventive concept.

The exemplary scanning part 210 scans an object to be copied, and generates image data in the form of, for example, an array of pixels. For purposes of explanation and not limitation, it will be assumed that the object to be copied in the present exemplary embodiment is a book, but the copying of other objects may benefit from the present general inventive concept, as will be readily recognized by the skilled artisan upon review of this disclosure. To copy each page, the book is laid opened and face-down against a scan plane (not shown) with opposing pages being unfolded. Due to the manner in which books are generally bound, a central part of the opposing pages is removed from the scan plane by a variable distance. FIG. 1 illustrates an example of an input image 100 generated by the scanning part 210. The input image 100 comprises a page image 120 corresponding to an image of each page, and a folding area 110, appearing as a dark region between opposite page images 120a and 120b. Similar distortion causing regions of the image to lack sufficient contrast to discern foreground from background may be caused by other imaging problems, and the present general inventive concept may be applied to compensate such other problems as well. Further, the present general inventive concept is not limited to the implementation details of the scanning part 210, which may be any device capable of producing image data of an object placed on its scan plane.

The exemplary memory part 220 stores the image data of the input image 100 generated by the scanning part 210. As illustrated in FIG. 2, the memory part 220 is connected between the scanning part 210 and the image processing part 230 so that the image processing part 230 can process the image data stored in the memory part 220. Alternatively, only image data produced by a pre-scanning process, which refers to a lower resolution scan for generating a preview image, may be stored in the memory part 220, and the profile information yet to be discussed can be generated from the image data held in the memory part 220 of the pre-scanned object. The image data of the input image 100 that is to be actually processed by the image processing part 230 may then be compensated concurrently with the full resolution scanning operation. The present general inventive concept is not limited to the implementation details of the memory part 220, which may be any device capable of retaining image data.

The exemplary image processing part 230 detects the folding area 110 in the image data of the input image 100 supplied from the memory part 220, and corrects the detected folding area 110 to output a corrected image. The image processing part 230 may remove the folding area 110 from the input image 100 to generate a single corrected image that includes both of the page images 120a and 120b. Alternatively, the image processing part 230 may divide the input image 100 about the folding area 110, and generate a first corrected image and a second corrected image respectively corresponding to the opposite page images 120a and 120b. The folding area 110 is a region in a pixel row which has a rapid brightness variation in comparison to a vicinal pixel region in the same row. As such, the present general inventive concept may be used where such a distorted region is defined in an image, regardless of the source and location of the distorted region. Further, the image processing part may be implemented in hardware, software or a combination of both. For example, the image processing part 230 may be embodied as a processor executing processing instructions that carry out various features of the present general inventive concept, such as those described in the exemplary embodiments below. Additionally, the image processing part 230 may be implemented as a separate system completely removed from the scanning part 210 and printing part 240 in processing applications that can be performed offline.

The exemplary printing part 240 formats the corrected image data generated by the image processing part 230 into a human recognizable form. For example, the printing part 240 may form the corrected image on a record media, such as paper, etc. The printing part 240 may print the corrected image on a single paper, or print the first corrected image and the second corrected image on separate papers. The printing part 240 may perform an ink jet printing, a laser printing or other various printing configurations. Alternatively, the printing part 240 may form the corrected image on a display device, such as a computer monitor. The present general inventive concept is not limited to a particular implementation of printing part 240 and many variations may be used without departing from the intended spirit and scope of the present general inventive concept.

Hereinafter, an exemplary configuration of the image processing part 230 according to the present embodiment will be described in detail.

To efficiently compensate image distortion caused in the folding area 110 by insufficient contact with the scan plane, the image processing part 230 includes a profile generating part 232, a profile analyzing part 234 and an image correcting part 236. The exemplary configuration illustrated in FIG. 2 depicts functional compartmentalization that facilitates the description of the image processing part 230 in the context of the illustrated embodiment. It is to be understood, however, that the present general inventive concept is not limited to such configuration. Combinations of functionality into alternative components and distribution of functionality across multiple other components fall within the intended spirit and scope of the present general inventive concept.

The exemplary profile generating part 232 generates profile information on the basis that each page of a book has a marginal area of a predetermined size in upper, lower, right and left sides thereof. The profile generating part 232 utilizes pixel values of an upper marginal area and pixel values of a lower marginal area to generate a profile of the page with respect to brightness. The marginal area is assumed to be primarily composed of pixels that have the same brightness value as the background of the rest of the image, with the exception of the portions of the marginal area in the folding area 110.

Figure 3A:
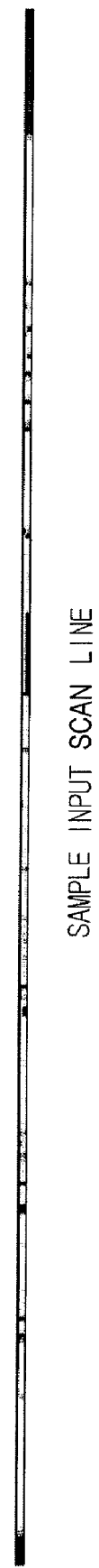
FIGS. 3A and 3B illustrate a generating order of a profile information according to the exemplary embodiment of the present general inventive concept.
Figure 3B:
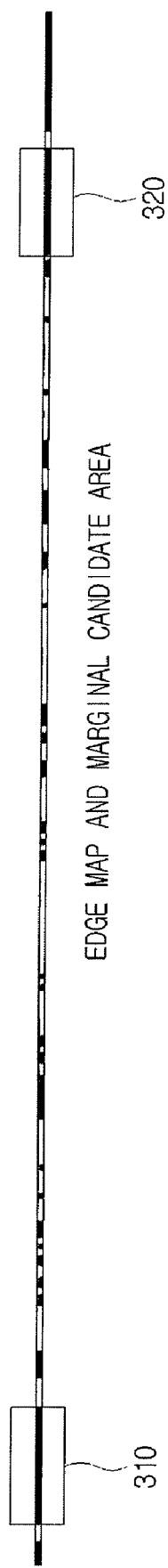

At first, a book to be copied is put on the scanning part 210. When a scan process is initiated, such as when a scan button is pushed, scanning is performed in scan lines from upper to lower ends of the image, as illustrated in the example of FIG. 1, and in image rows from right to left in the scanning direction as illustrated in the example in FIG. 1. The scanned image data may be stored in the memory part 220. Also, if the book to be copied is put on the scanning part 210 to be pre-scanned, a pre-scanning is performed from right to left as illustrated in FIG. 1, and data with respect to each scan line is generated and stored in the memory part 220. An example of an input scan line is illustrated in FIG. 3A. Considering pixel values of a specific scan line as illustrated in FIG. 3A, a corresponding edge map as illustrated in FIG. 3B is generated by the profile generating part 232. Here, uniform areas positioned on opposite sides of the edge map, as illustrated in FIG. 3B, are respectively designated to be marginal candidate areas 310 and 320.

Figure 4:
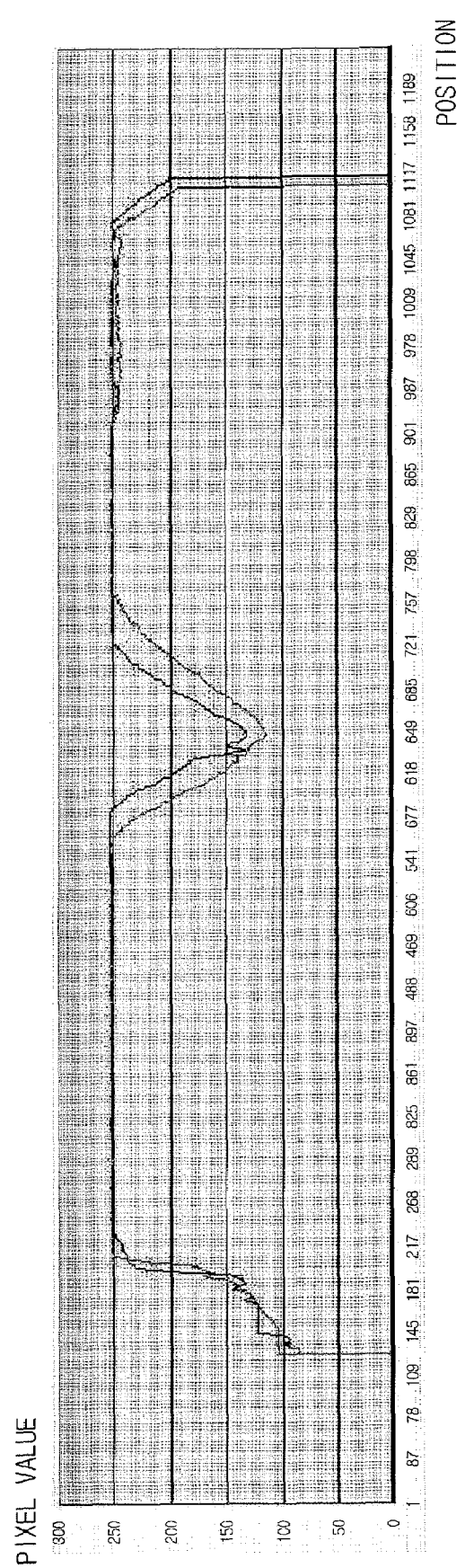
FIG. 4 is a graph illustrating the profile information generated according to the exemplary embodiment of the present general inventive concept.

Then, a profile is formed, such as from pixel brightness values, from each image row having a maximum pixel value in the two candidate areas. That is, an upper profile may be obtained from an image row having a maximum pixel area in an upper candidate area, and a lower profile may be obtained from an image row having a maximum pixel value in a lower candidate area. FIG. 4 illustrates a graph of an exemplary upper profile and an exemplary lower profile generated according to the present embodiment. The graph plotted from left to right illustrated in FIG. 4 represents the pixel values of the image data in the upper and lower marginal areas, respectively, from left to right, with respect to the image illustrated in FIG. 1.

Referring to FIG. 4, one of the lines in the graph depicts values of the upper profile and the other line depicts values of the lower profile. The central area of the graph corresponds to the folding area 110 of the input image 100, and, as is readily observed, a pixel value in the folding area 110 is reduced to approximately half that of the marginal area. Accordingly, characteristics of the folding area 110 can be determined from the data obtained from the upper candidate area and the lower candidate area.

The exemplary profile analyzing part 234 analyzes the profile information obtained by the profile generating part 232 and determines a background value of the image data stored in the memory part 220, and also determines whether to perform an image correction. Also, if the profile information is generated by a pre-scanning operation, the profile analyzing part 234 determines a background value for an image that will be scanned at full resolution, and determines whether to perform an image correction.

In certain embodiments of the present general inventive concept, a histogram analysis of the profile obtained in a in the profile generating part 232 is performed. Taking a histogram for the profile of the $n^{th}$ image row in the marginal areas as H(n), where the occurrence of each pixel value is counted into a corresponding histogram bin k, the pixel value corresponding to bin k which is maximal in H(n−1)+H(n)+H(n+1) may be selected as a first background value (Background_1). In other embodiments, the pixel value corresponding to bin k which is maximal in H(n) may be regarded as the first background value. However, adding profiles of different image rows in the candidate areas together may minimize the effects of noise on the analysis.

The first background value may serve as a reference value to determine if a region of the image is to be compensated. For example, if it is determined from the histogram analysis that the first background value is 240, such is consistent with the example in the graph of FIG. 4, any scan line corresponding to a value in the profile less than 240 would require image compensation. Certain embodiments of the present general inventive concept determine from the computed first background value and the profile which scan lines require compensation, while other embodiments may make the determination during the image correcting processes, as will be described in context with the image correcting part 236 below.

The exemplary image correcting part 236 performs a correction by using the profile and the first background value which are calculated in the previous stage.

Figure 5:
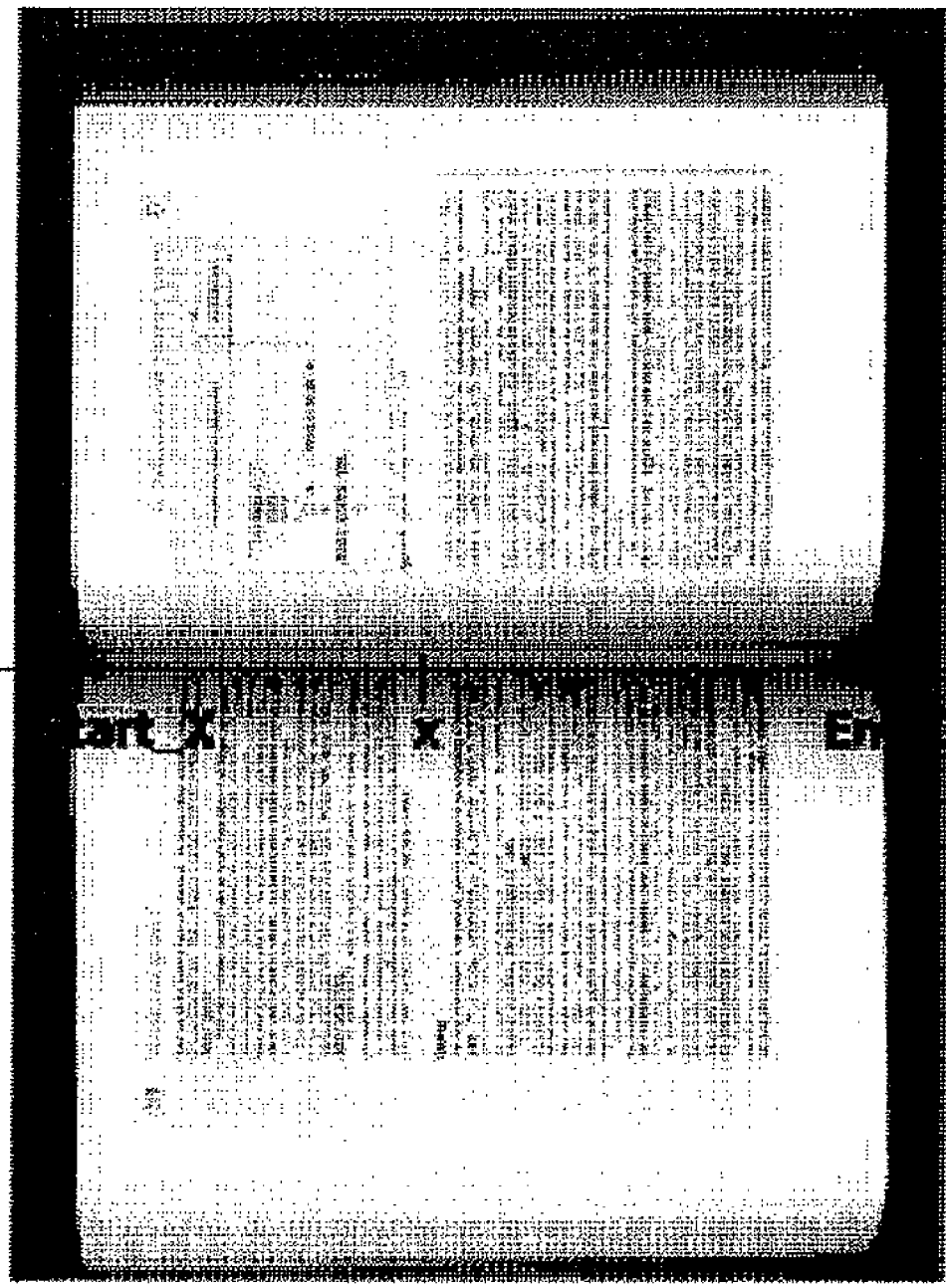
FIG. 5 illustrates a coordinate for correcting an image data according to the exemplary embodiment of the present general inventive concept.

Referring now to FIG. 5, a pixel at coordinate (x, y), may be characterized by its red pixel value R, its green pixel value G and its blue pixel value B. In certain embodiments of the present general inventive concept, the RGB data at coordinate (x, y) are converted into a brightness value Y and chrominance values (Cb, Cr). The correction may then be performed only to the brightness value Y, and the chrominance values (Cb, Cr) are stored to be reapplied after distortion compensation.

Then, a second background value (Background_2) of the coordinate (x, y) is calculated by, for example, the following Equation 1:

$$\text{Background\_2} = (BPV(y) - TPV(y))\frac{x - \text{Start\_x}}{\text{End\_x} - \text{Start\_x}} + TPV(y). \quad \text{Equation (1)}$$

Here, TPV refers to an upper profile value, and BPV refers to a lower profile value. If a brightness value at Start_x in scan line y is TPV(y) and a brightness value at End_x in scan line y is BPV(y), then the second background value at position x in scan line y can be calculated by interpolation, as exemplified in Equation 1 above.

In certain embodiments of the present general inventive concept, the brightness value BPV(y) and/or TPV(y) is evaluated against the background value determined by the profile analyzing part, and, if BPV(y) of TPV(y) is less than the background value, the pixels in the scan line along y are compensated, such as by the process described below.

In the folding area 110 of the input image 100, where the brightness value BPV(y) and TPV(y) are less than the background value, the corrected pixel value may be calculated by, for example, Equation 2 below to correct the image data.

$$Ycorrected(x, y) = \frac{Background\_1 - min\_1}{Background\_2 - min\_2}(Yoriginal(x, y) - min\_2) + min\_1.$$

Equation (2)

Here, Ycorrected (x, y) refers to corrected brightness value at the coordinate (x, y), and Yoriginal (x, y) refers to image data at the coordinate (x, y) before correction. Also, min_1 and min_2 are variable offset values that can be determined by any suitable means on a per-application basis. Any foreground image data, such as a character at the coordinate (x, y), is assumed to be distorted to the same degree as the background, and distortion compensation in accordance with the present general inventive concept will increase the contrast between the background and the foreground. If the experimental offset values, min_1 and min_2 are 0, the following expression is derived.

$$Ycorrected(x,y):Yoriginal(x,y)=Background\_1:Background\_2$$

For example, if the first background value is 250, the second background value is 170 and the image data before correction is 100, the corrected image brightness value would be 147.

Figure 6:
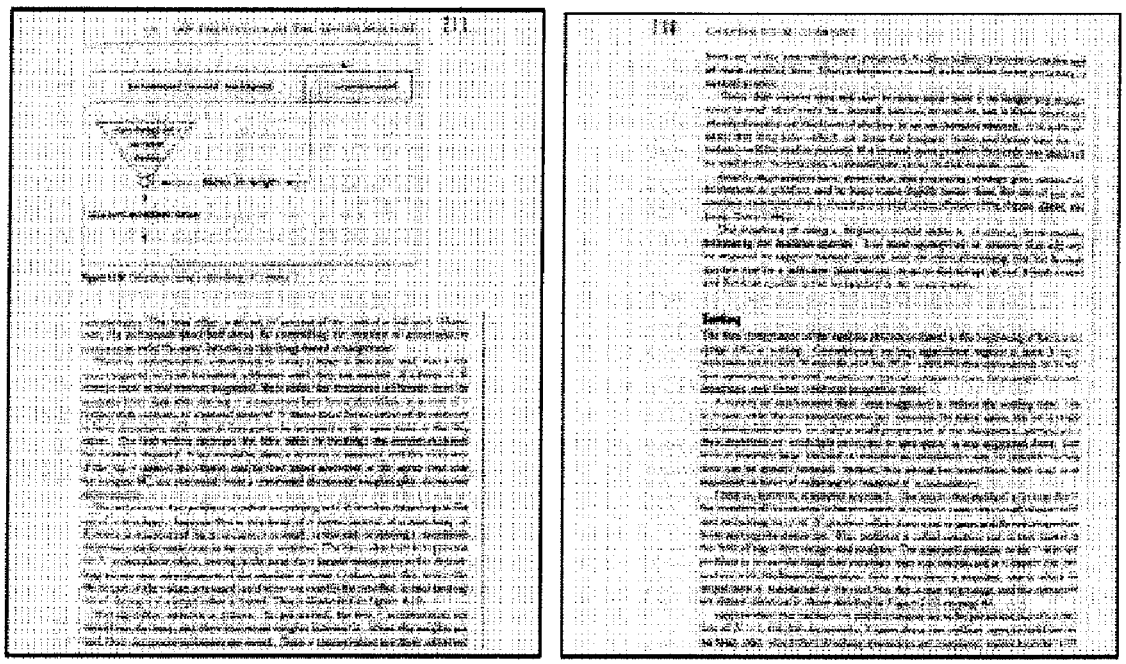
FIG. 6 illustrates an image after correction of the image data according to the exemplary embodiment of the present general inventive concept.

Lastly, corrected red pixel value R, green pixel value G and blue pixel value B are calculated by using Ycorrected (x, y) and the chrominance information (Cb, Cr) of the original image. An exemplary corrected image is illustrated in FIG. 6.

Figure 7:
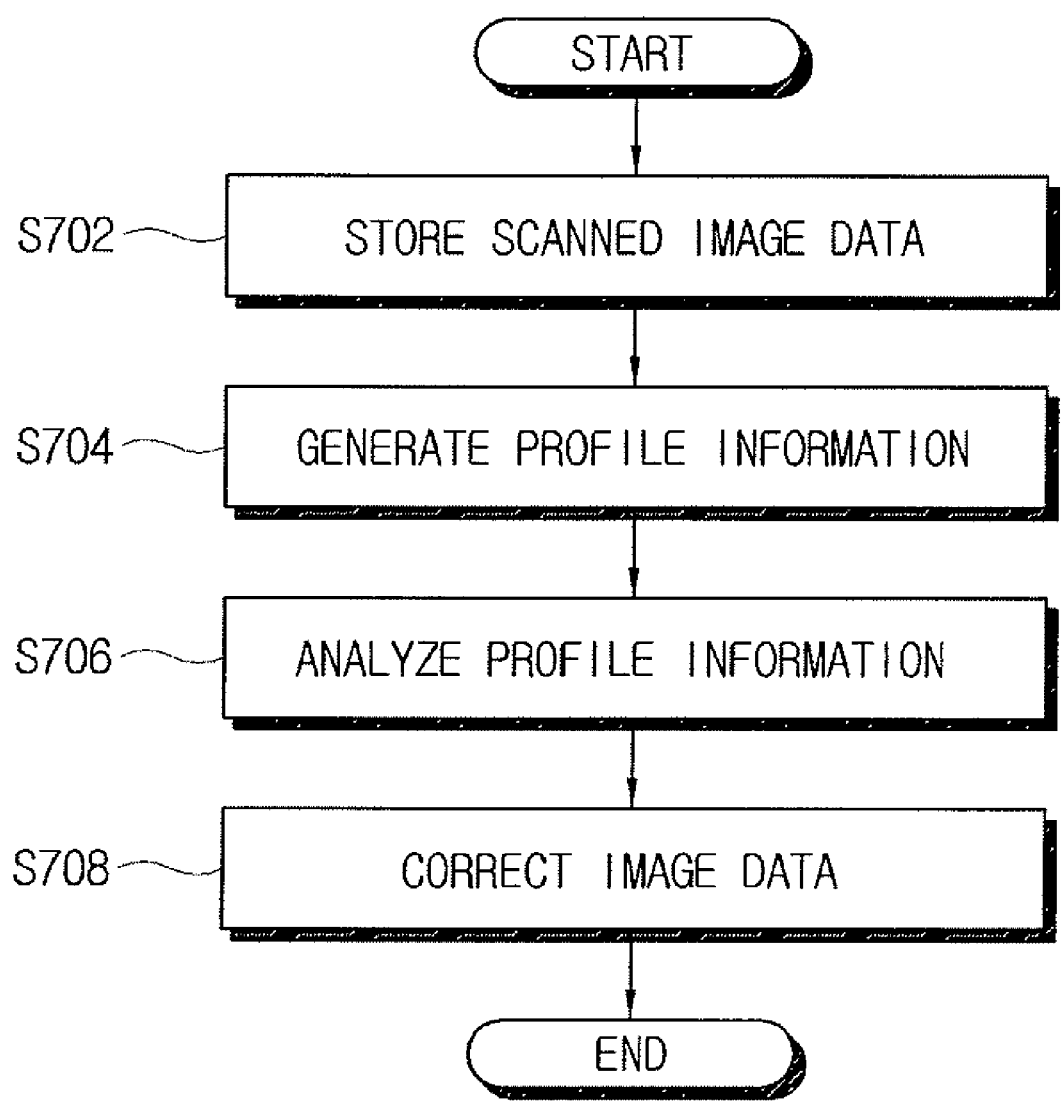
FIG. 7 is a flow chart illustrating an image form method according to an exemplary embodiment of the present general inventive concept.

FIG. 7 is a flowchart illustrating an image forming method of an exemplary embodiment of the present general inventive concept.

If a book to be copied is put on the scanning part 210 and the scan is initiated, a scanned image is stored in the memory part 220 (operation S702).

Profile information is generated using pixel values in a marginal area of the image stored in the memory part 220 (operation S704). That is, pixel values in a specific scan line of the image data are converted into an edge map, and uniform areas positioned on opposite sides of the edge map are respectively designated as candidate areas. Then, the profile information respectively contains profile values from an image row having a maximum pixel value in the two candidate areas. That is, an upper profile is obtained from an image row having a maximum pixel area in an upper candidate area, and a lower profile is obtained from an image row having a maximum pixel value in a lower candidate area.

The profile information is analyzed to determine a first background value of the image data (operation S706). That is, the profile analyzing part 234 analyzes the profile obtained by the profile generating part 232 and determines a background value of the image stored in the memory part 220, and determines whether and where to perform the image correction, such as described above. Also, if the profile information is obtained in a pre-scanning operation, a first background value of the pre-scanned image is determined from the low resolution pre-scanned image and presumed for the full resolution scan, and it is determined whether to perform an image correction on the full resolution image.

Then, a correction of the image data is performed (operation S708). At first, red pixel value R, green pixel value G and blue pixel value B of a pixel at coordinate (x, y) are converted into a brightness value Y and chrominance values (Cb, Cr), and the correction is performed by using only the brightness value Y. Then, a second background value (Background_2) at the coordinate (x, y) is calculated, and the folding area 110 of the input image 100 is corrected. Lastly, corrected red pixel value R, green pixel value G and blue pixel value B are calculated from Ycorrected (x, y) and the chrominance information (Cb, Cr) of the original image.

As described above, the present general inventive concept provides an image forming apparatus and an image forming method to efficiently compensate image distortion due to a varying distance of the object being scanned from a scan plane.

Also, the present general inventive concept provides an image forming apparatus and an image forming method to detect a folding area of a book to remove a distorted specific area of an input image.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method for processing an image data obtained by scanning opposing pages of a book that is laid-open facing-down against a scan plane, the method comprising:
   determining a background brightness value associated with a marginal area of the image data;
   determining a folding area of the image data representing a central part of the opposing pages of the book;
   determining a first brightness value associated with a first region of the folding area of the image data;
   determining a second brightness value associated with a second region of the folding area of the image data; and
   performing a correction on background pixels in the folding area of the image data by adjusting values of background pixels in the folding area of the image data on a pixel-by-pixel basis based on the background brightness value and an interpolation value obtained from an interpolation of the first brightness value and the second brightness value.

2. The method according to claim 1, further comprising:
   generating a profile from pixel values of the marginal area of the image,
   wherein the background brightness value is determined by analyzing the profile.

3. The method according to claim 2, wherein the generating of the profile includes:
   obtaining an upper profile based on pixel values of an upper marginal area; and
   obtaining a lower profile based on pixel values of a lower marginal area.

4. The method according to claim 3, wherein each profile is obtained from an image row having a maximum pixel value in each marginal area.

5. The method according to claim 4, wherein the performing of the correction includes:
   correcting a brightness value of the image pixel.

6. The method according to claim 5, wherein the performing of the correction further comprises:
   converting a red pixel value, a green pixel value and a blue pixel value of the image data into the brightness value and a chrominance value.

7. The method according to claim 3, wherein the performing of the correction includes:
   correcting a brightness value of the pixels in the image data.

8. The method according to claim 7, wherein the performing of the correction further comprises:

converting a red pixel value, a green pixel value and a blue pixel value of the pixels into a brightness value and a chrominance value.

9. The method according to claim 1, wherein the performing of the correction includes:

correcting a brightness value of the pixels.

10. The method according to claim 9, wherein the performing of the correction further comprises:

converting a red pixel value, a green pixel value and a blue pixel value of the image data into a brightness value and a chrominance value.

11. An image forming apparatus, comprising:

a scanning part operable to scan a book that is laid-open facing down against a scan plane and to generate image data based thereon; and an image correcting part to determine a background brightness value associated with a marginal area of the image data, to determine a folding area of the image data representing a central part of opposing pages of the book, to determine a first brightness value associated with a first region of the folding area of the image data, to determine a second brightness value associated with a second region of the folding area of the image data, and to correct background pixels in the folding area of the image data by adjusting values of the background pixels in the folding area of the image data on a pixel-by-pixel basis based on the background brightness value and an interpolation value obtained from an interpolation of the first brightness value and the second brightness value.

12. The image forming apparatus according to claim 11, further comprising:

a profile generating part which uses pixel values of a marginal area of the image data to generate a profile; and a profile analyzing part which analyzes the profile to determine a background brightness value associated with the marginal area of the image data.

13. The image forming apparatus according to claim 12, further comprising:

a scanning part to obtain the image as a plurality of image rows obtained through a plurality of scan lines, the scanning part to operate in one of a low resolution pre-scanning mode and a full resolution scanning mode.

14. The image forming apparatus according to claim 13, wherein the profile is generated by the profile generating part from the image as obtained in the pre-scanning mode of the scanning part.

15. The image forming apparatus according to claim 14, wherein the brightness value is corrected on the image obtained in the scanning mode of the scanning part.

16. The image forming apparatus according to claim 15, wherein the brightness value is corrected on each scan line as the image is obtained in the scanning mode of the scanning part.

* * * * *